US011880515B1

(12) United States Patent
Lin et al.

(10) Patent No.: US 11,880,515 B1
(45) Date of Patent: Jan. 23, 2024

(54) TOUCH PAD STRUCTURE AND ELECTRONIC DEVICE THEREOF

(71) Applicant: ASUSTeK COMPUTER INC., Taipei (TW)

(72) Inventors: Sheng-Ta Lin, Taipei (TW); Tsung-Ju Chiang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/308,674

(22) Filed: Apr. 27, 2023

(30) Foreign Application Priority Data

Feb. 16, 2023 (TW) .................................. 112201332

(51) Int. Cl.
*G06F 3/038* (2013.01)
*G06F 3/0354* (2013.01)

(52) U.S. Cl.
CPC .......... *G06F 3/03547* (2013.01); *G06F 3/038* (2013.01)

(58) Field of Classification Search
CPC ... G06F 3/01; G06F 1/16; G06F 3/016; G06F 1/165; G06F 1/1616; G06F 3/0488; G06F 3/0416; G06F 3/0414; G06F 3/0412; G06F 3/044; G06F 3/038
See application file for complete search history.

(56) References Cited

U.S. PATENT DOCUMENTS

| | | | |
|---|---|---|---|
| 10,656,714 B2 * | 5/2020 | Ligtenberg | H03K 17/9622 |
| 11,366,523 B2 * | 6/2022 | Ligtenberg | G06F 1/1662 |
| 11,371,270 B2 * | 6/2022 | Leonardi | E05B 81/86 |
| 11,463,090 B2 * | 10/2022 | You | H01H 13/702 |
| 11,720,176 B2 * | 8/2023 | Ligtenberg | G06F 1/1662 |
| | | | 345/173 |
| 11,740,706 B2 * | 8/2023 | You | H03K 17/98 |
| | | | 345/168 |
| 2018/0217668 A1 * | 8/2018 | Ligtenberg | G06F 1/1616 |
| 2018/0217669 A1 * | 8/2018 | Ligtenberg | H03K 17/9643 |
| 2020/0278747 A1 * | 9/2020 | Ligtenberg | H03K 17/9622 |

FOREIGN PATENT DOCUMENTS

| | | |
|---|---|---|
| CN | 114185442 | 3/2022 |
| TW | 202113565 | 4/2021 |
| TW | I725297 | 4/2021 |

* cited by examiner

*Primary Examiner* — Olga V Merkoulova
(74) *Attorney, Agent, or Firm* — JCIPRNET

(57) ABSTRACT

A touch pad structure including a carrier, a frame, a touch pad, a switch and four first springs is provided. The frame is disposed above the carrier. The touch pad is disposed on the frame, and the frame is located between the carrier and the touch pad. The switch is disposed on the touch pad and penetrates through the frame and thus faces the carrier. The first springs are distributed at a peripheral of the touch pad. Two opposite ends of each of the first springs respectively contact the carrier and the frame. Two longest connecting lines between the first springs are defined as a first connecting line and a second connecting line. The switch is seated on an intersection point of the first connecting line and the second connecting line. An electronic device is also provided.

12 Claims, 8 Drawing Sheets

TOUCH PAD STRUCTURE AND ELECTRONIC DEVICE THEREOF

CROSS-REFERENCE TO RELATED APPLICATION

This application claims the priority benefit of Taiwan application serial no. 112201332, filed on Feb. 16, 2023. The entirety of the above-mentioned patent application is hereby incorporated by reference herein and made a part of this specification.

BACKGROUND

Technical Field

The disclosure relates to a touch control technology, and in particular relates to a touch pad structure and an electronic device thereof.

Description of Related Art

The touch pad on a common notebook computer has a fulcrum end connected to the body and a movable end opposite to the fulcrum end, and a switch is disposed on the movable end. Once the finger of the user presses or taps on the touch pad too close to the fulcrum end, the switch on the movable end is not easy or impossible to be triggered, thus it is inconvenient in operation. On the other hand, in the process of placing the palm of the user on the body and tapping the keyboard with fingers, the palm may contact the touch pad, and even generate downward pressure on the touch pad, causing the switch to be accidentally triggered, thus it is unreliable in operation.

SUMMARY

This disclosure provides a touch pad structure, including a carrier, a frame, a touch pad, a switch, and four first springs. The frame is disposed above the carrier. The touch pad is disposed on the frame, and the frame is located between the carrier and the touch pad. The switch is disposed on the touch pad and penetrates through the frame and thus faces the carrier. The first springs are distributed at a peripheral of the touch pad. The first springs are disposed between the carrier and the frame, and two opposite ends of each of the first springs respectively contact the carrier and the frame. Two longest connecting lines between the four first springs are defined as a first connecting line and a second connecting line. The switch is seated on an intersection point of the first connecting line and the second connecting line.

This disclosure also proposes an electronic device, including a body and the aforementioned touch pad structure. The body has a structural member, and the touch pad structure is disposed in the body.

Based on the above, the switch is located at the center of the touch pad, and the touch pad that is pressed or tapped may sink as a whole to trigger the switch. Furthermore, the pressing or tapping behavior from the user on any position on the touch pad may drive the touch pad to sink to trigger the switch. Therefore, for the user, the touch pad structure and the electronic device of the disclosure have excellent operation convenience.

DETAILED DESCRIPTION OF DISCLOSED EMBODIMENTS

Figure 1A:
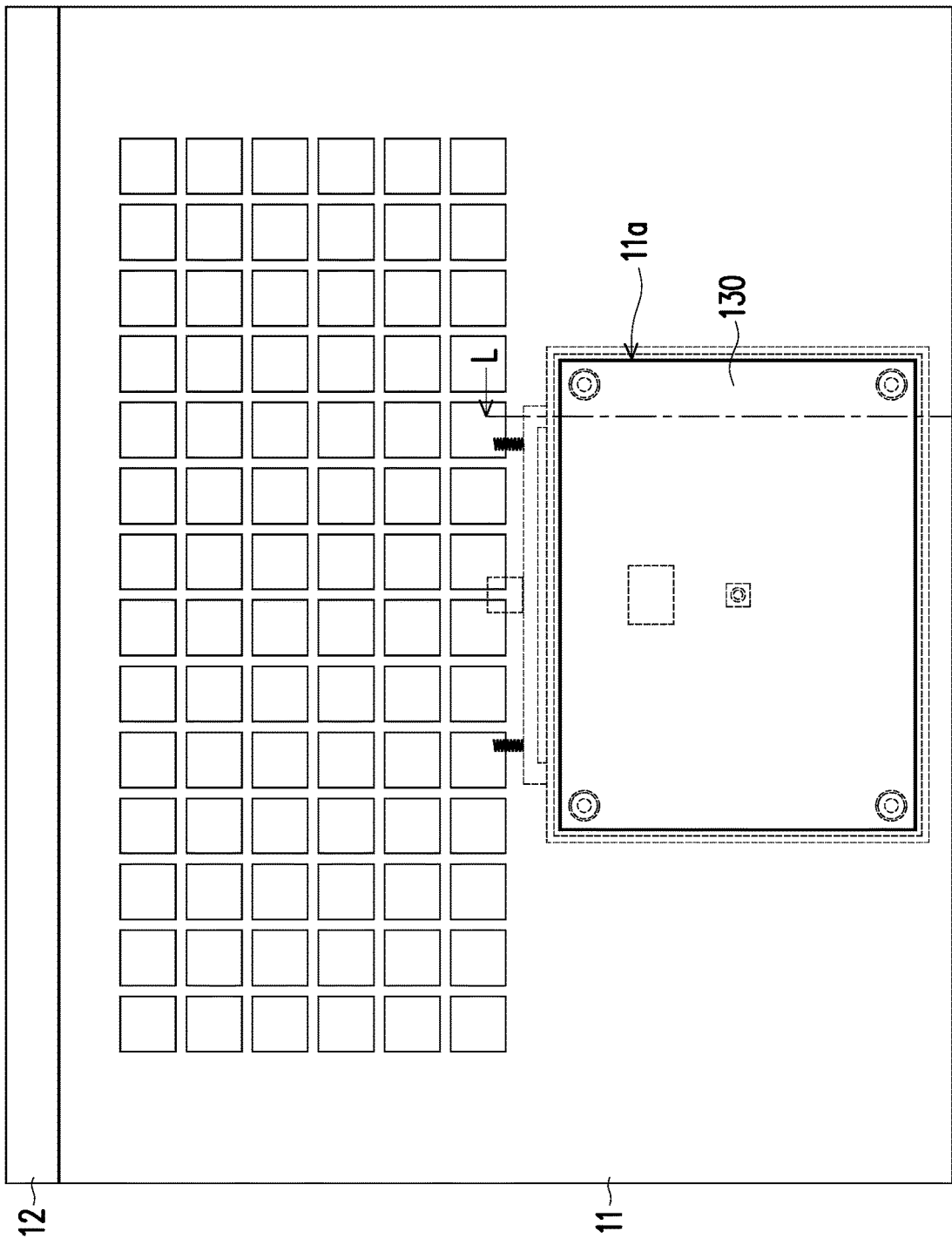
FIG. 1A is a top schematic view of the electronic device according to the first embodiment of the disclosure.
Figure 1B:
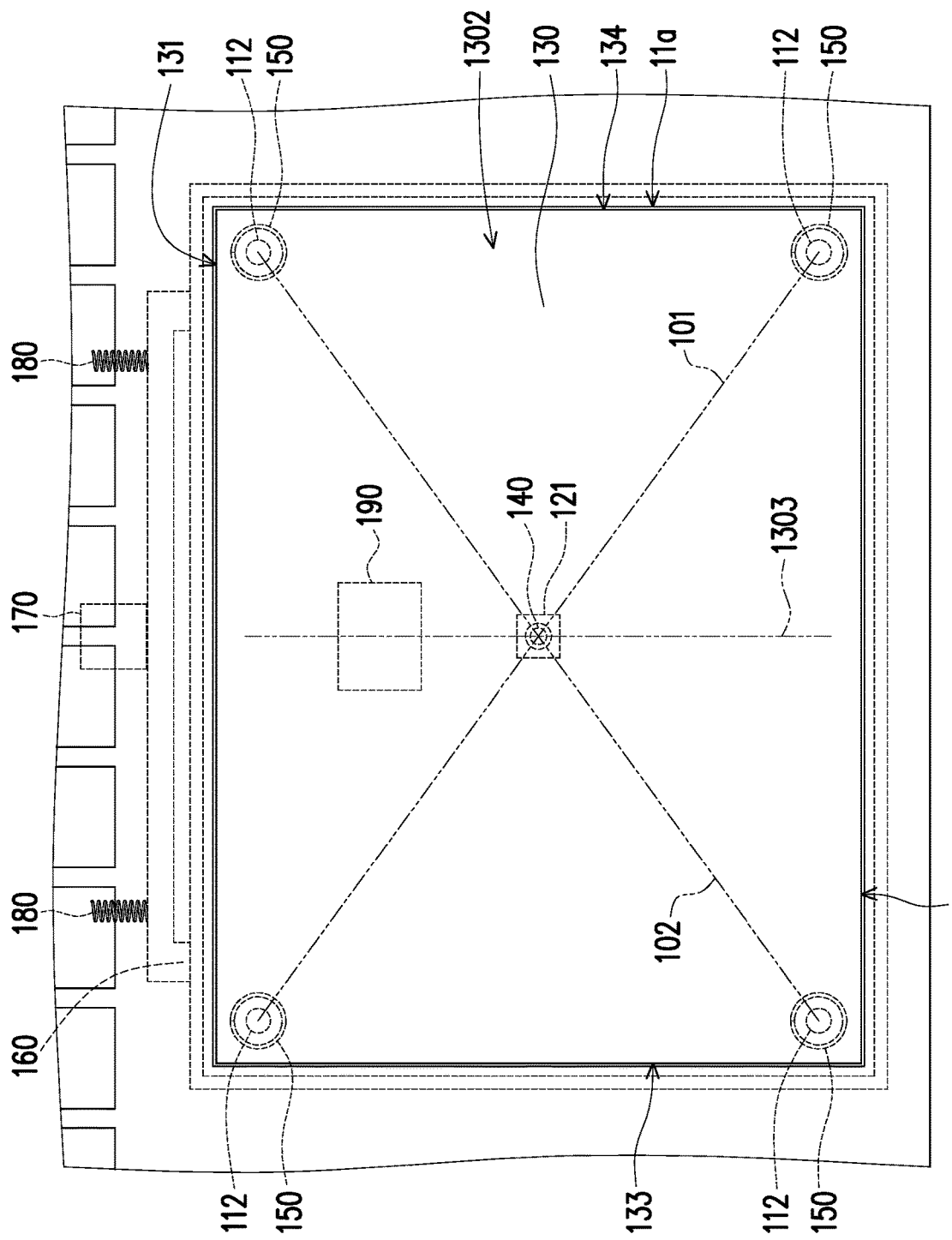
FIG. 1B is a partially enlarged schematic view of the electronic device in FIG. 1A.
Figure 1C:
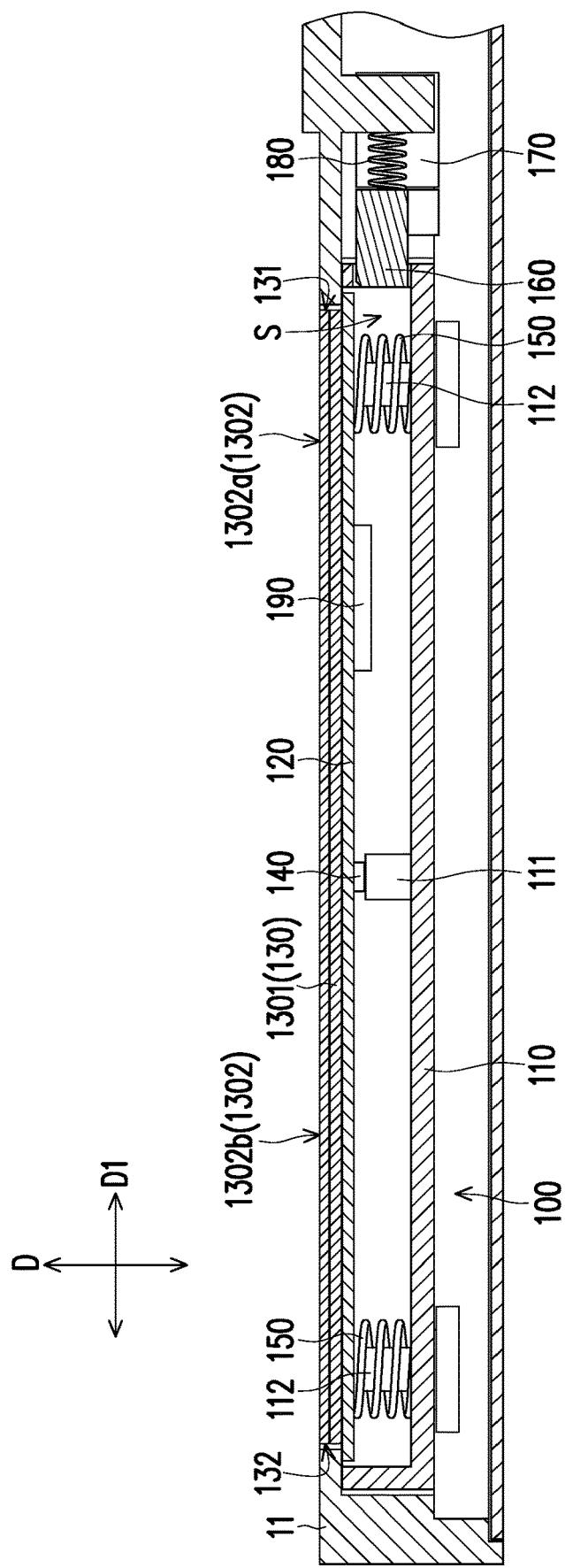
FIG. 1C is a partial cross-sectional schematic view of the electronic device in FIG. 1A along the section line L-L.

Referring to FIG. 1A to FIG. 1C, a touch pad structure 100 and an electronic device 10 is provided in the disclosure. In one embodiment, the electronic device 10 may be a notebook computer and includes a first body 11, a second body 12, and the touch pad structure 100. The first body 11 may be a host with logic operation and data access capabilities, and the second body 12 may be a display pivotally connected to the first body 11. In addition, the touch pad structure 100 is disposed in the first body 11, and a portion of the touch pad structure 100 is exposed to the opening 11a of the first body 11, so that the user may operate the touch pad structure 100.

Referring to FIG. 1B and FIG. 1C, the touch pad structure 100 provided in this disclosure includes a carrier 110, a frame 120, a touch pad 130, a switch 140, and four first springs 150.

The carrier 110 is fixed inside the first body 11, and the frame 120 is movably disposed above the carrier 110. The touch pad 130 is disposed on the frame 120, and the frame 120 is located between the carrier 110 and the touch pad 130.

The switch 140 is disposed on the touch pad 130 and penetrates through the frame 120 to face the carrier 110. For example, the frame 120 has a through hole 121, and the switch 140 protrudes towards the bottom of the carrier 110 through the through hole 121.

In one embodiment, the touch pad 130 includes a touch layer 1301 for sensing the sliding behavior of the finger of the user on the touch pad 130.

In one embodiment, the switch 140 may be a dome switch (dome switch), and the finger of the user pressing or tapping on the touch pad 130 may trigger the switch 140 to execute an application program, open or close a file, or other commands.

In one embodiment, the touch surface 1302 of the touch pad 130 is exposed to the opening 11a, and the touch pad 130 and the switch 140 may move relative to the carrier 110 synchronously with the frame 120, for example, sink or lift along the direction D perpendicular to the touch surface 1302.

In one embodiment, the switch 140 is located at the center of the touch pad 130, such as the geometric center of the touch pad 130. The pressing or tapping behavior from the finger of the user on any position on the touch pad 130 may drive the touch pad 130 and the frame 120 to sink as a whole to trigger the switch 140, thereby having excellent operation convenience.

Referring to FIG. 1C, the first springs 150 are disposed between the carrier 110 and the frame 120, and two opposite ends of each of the first springs 150 respectively contact the carrier 110 and the frame 120. The first springs 150 may be compression springs, and when the touch pad 130 and the frame 120 sink, the first springs 150 are compressed. Once the pressing force applied to the touch pad 130 is removed, the elastic restoring force of the first springs 150 may drive the touch pad 130 and the frame 120 to lift and reset.

Referring to FIG. 1B and FIG. 1C, the first springs 150 are distributed at a peripheral of the touch pad 130, such as the four corners. Further, the first connecting line 101 between two first springs 150 located at two diagonal corners intersects the second connecting line 102 between the other two first springs 150 located at the other two diagonal corners, and the switch 140 is seated on the intersection point of the first connecting line 101 and the second connecting line 102. Furthermore, the first connecting line 101 and the second connecting line 102 are the two longest connecting lines between the first springs 150.

On the other hand, the touch pad 130 has a first side 131, a second side 132 opposite to the first side 131, a third side 133, and a fourth side 134 opposite to the third side 133. The third side 133 and the fourth side 134 are located between the first side 131 and the second side 132. The distance between the switch 140 and the first side 131 is equal to the distance between the switch 140 and the second side 132, and the distance between the switch 140 and the third side 133 is equal to the distance between the switch 140 and the fourth side 134.

In one embodiment, the touch pad 130 has a center line 1303 passing through the switch 140, and the center line 1303 is perpendicular to the first side 131 and the second side 132. Furthermore, the two first springs 150 located at two adjacent corners and the other two first springs 150 located at the other two adjacent corners are symmetrically disposed on opposite sides of the center line 1303. Based on the even distribution of the first springs 150, the first springs 150 may evenly provide supporting force or restoring force to the frame 120, so that the frame 120 and the touch pad 130 on the frame 120 remain horizontal when sinking or lifting.

Referring to FIG. 1B to FIG. 2B, in an embodiment, the touch pad structure 100 further includes a limiting member 160, a driver 170, and a second spring 180. The limiting member 160 is disposed corresponding to the first side 131 of the touch pad 130 and is adapted to slide along a direction D1 perpendicular to the direction D. The driver 170 is coupled to the limiting member 160, and the driver 170 may be a solenoid valve. The second spring 180 and the driver 170 are disposed on the same side of the limiting member 160, in which the second spring 180 may be a tension spring, and the two opposite ends of the second spring 180 are respectively connected to the limiting member 160 and the body 11.

Figure 2A:
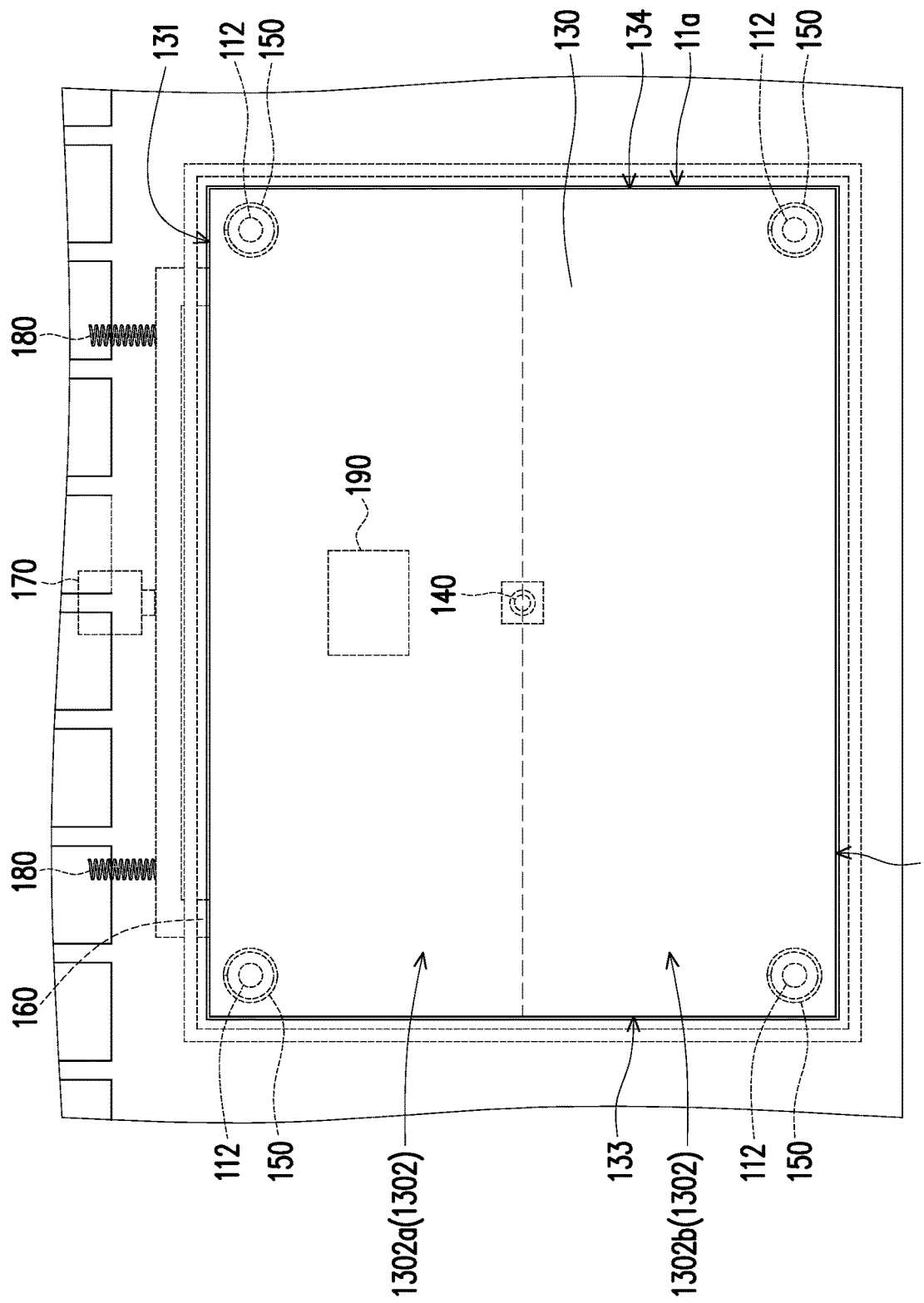
FIG. 2A is a partial top schematic view of the electronic device of FIG. 1A switched to another operation mode.
Figure 2B:
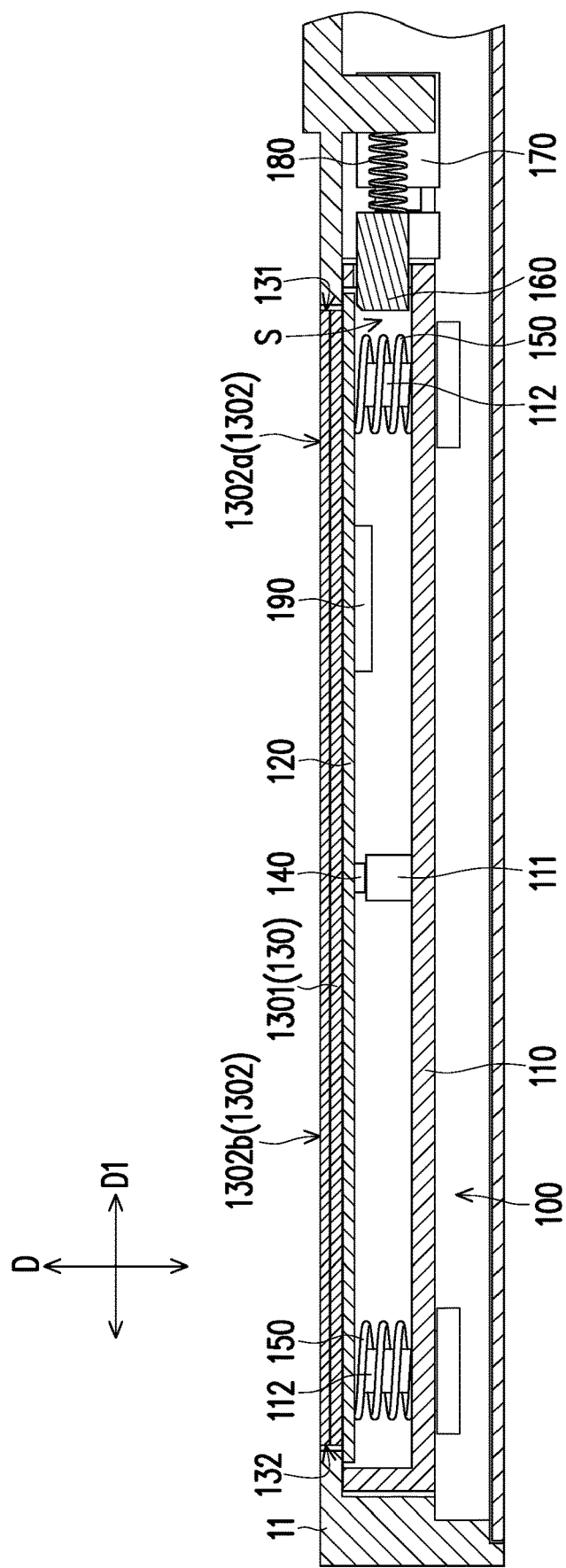
FIG. 2B is a partial cross-sectional schematic view of the electronic device of FIG. 1C switched to another operation mode.

As shown in FIG. 2B, when the driver 170 is activated, the driver 170 may drive the limiting member 160 to slide to the locking position, so that the limiting member 160 moves into the space S between the frame 120 and the carrier 110. When the limiting member 160 slides to the locking position, the second spring 180 is stretched. Once the driver 170 is turned off, the elastic restoring force of the second spring 180 may drive the limiting member 160 to slide to the unlocking position, so that the limiting member 160 moves out of the space S between the frame 120 and the carrier 110, as shown in FIG. 1C.

In the unlocking mode shown in FIG. 1C, the pressing or tapping behavior from the finger of the user on any position on the touch pad 130 may drive the touch pad 130 and the frame 120 to sink as a whole to trigger the switch 140. In the locking mode shown in FIG. 2B, the touch pad 130 and a partial area of the frame 120 are stopped by the limiting member 160 and cannot sink, preventing the switch 140 from being accidentally triggered.

For example, the body 110 has a slidably disposed structural member, and the limiting member 160 is a portion of the structural member. The driver 170 is coupled to the structural member, and one end of the second spring 180 is connected to the structural member. The driver 170 in cooperation with the second spring 180 may drive the structural member to slide back and forth, so that the limiting member 160 moves into or out of the space S.

Referring to FIG. 2A and FIG. 2B, the touch surface 1302 of the touch pad 130 may be divided into a first touch area 1302a located between the first side 131 and the switch 140 and a second touch area 1302b located between the second side 132 and the switch 140. The boundary line between the first touch area 1302a and the second touch area 1302b may be perpendicular to the third side 133 and the fourth side 134.

In the unlocking mode shown in FIG. 1C, the pressing or tapping behavior from the finger of the user in the first touch area 1302a or the second touch area 1302b may drive the touch pad 130 and the frame 120 to sink as a whole to trigger the switch 140. In the locking mode shown in FIG. 2B, the limiting member 160 is below the first touch area 1302a.

Therefore, the pressing or tapping behavior from the finger of the user in the first touch area 1302a cannot drive the touch pad 130 and the frame 120 to sink, so that the switch 140 cannot be triggered. On the contrary, the pressing or tapping behavior from the finger of the user in the second touch area 1302b may still drive the partial area of the touch pad 130 and the frame 120 to sink, so as to trigger the switch 140.

Referring to FIG. 1C and FIG. 2B, in an example, the touch pad 130 is a capacitive touch pad, and the touch layer 1301 is a capacitive touch layer. When the touch layer 1301 detects a first touch event (e.g., the palm of the user contacts the touch surface 1302 of the touch pad 130), the driver 170 is activated to drive the limiting member 160 to slide into the space S between the frame 120 and the carrier 110, so that the first touch area 1302a forms a static area, and the second touch area 1302b forms an active area.

Therefore, the pressing or tapping behavior from the finger of the user in the first touch area 1302a cannot drive the touch pad 130 and the frame 120 to sink, preventing the switch 140 from being accidentally triggered, thereby improving operational reliability. On the contrary, the pressing or tapping behavior from the finger of the user in the second touch area 1302b may still drive the partial area of the touch pad 130 and the frame 120 to sink, so as to trigger the switch 140.

On the other hand, when the touch layer 1301 detects a second touch event (e.g., the finger of the user contacts the touch surface 1302 of the touch pad 130), the driver 170 is turned off, and the elastic restoring force of the second spring 180 drives the limiting member 160 to slide out of the space S between the frame 120 and the carrier 110, so that both the first touch area 1302a and the second touch area 1302b form an active area. Therefore, the pressing or tapping behavior from the finger of the user in the first touch area 1302a or the second touch area 1302b may drive the touch pad 130 and the frame 120 to sink as a whole to trigger the switch 140.

Referring to FIG. 1C and FIG. 2B, in another embodiment, the touch pad structure 100 further includes a sensor 190, such as an ultrasonic sensor, a laser sensor, an infrared sensor, a time-of-flight (TOF) sensor, an image sensor, or other suitable non-contact sensor. Specifically, the sensor 190 is disposed on the frame 120 and located between the frame 120 and the carrier 110. The sensor 190 may be used to detect a touch event on the touch pad 130, if a third touch event is detected (e.g., the palm of the user contacts the touch surface 1302 of the touchpad 130), the driver 170 is activated. On the contrary, if a fourth touch event is detected (e.g., the finger of the user contacts the touch surface 1302 of the touch pad 130), the driver 170 is turned off.

Referring to FIG. 1B and FIG. 1C, in this embodiment, the carrier 110 includes a trigger 111 and four positioning posts 112 protruding toward the frame 120. The trigger 111 faces the frame 120 and is located at a position corresponding to the switch 140. Furthermore, the orthographic projection of the trigger 111 and the switch 140 overlaps, so the trigger 111 is also seated on the intersection point of the first connecting line 101 and the second connecting line 102. On the other hand, the positioning posts 112 are distributed on the four corners of the touch pad 130, and the first springs 150 are respectively sleeved on the positioning posts 112 to prevent the positions of the first springs 150 from shifting.

Figure 3:
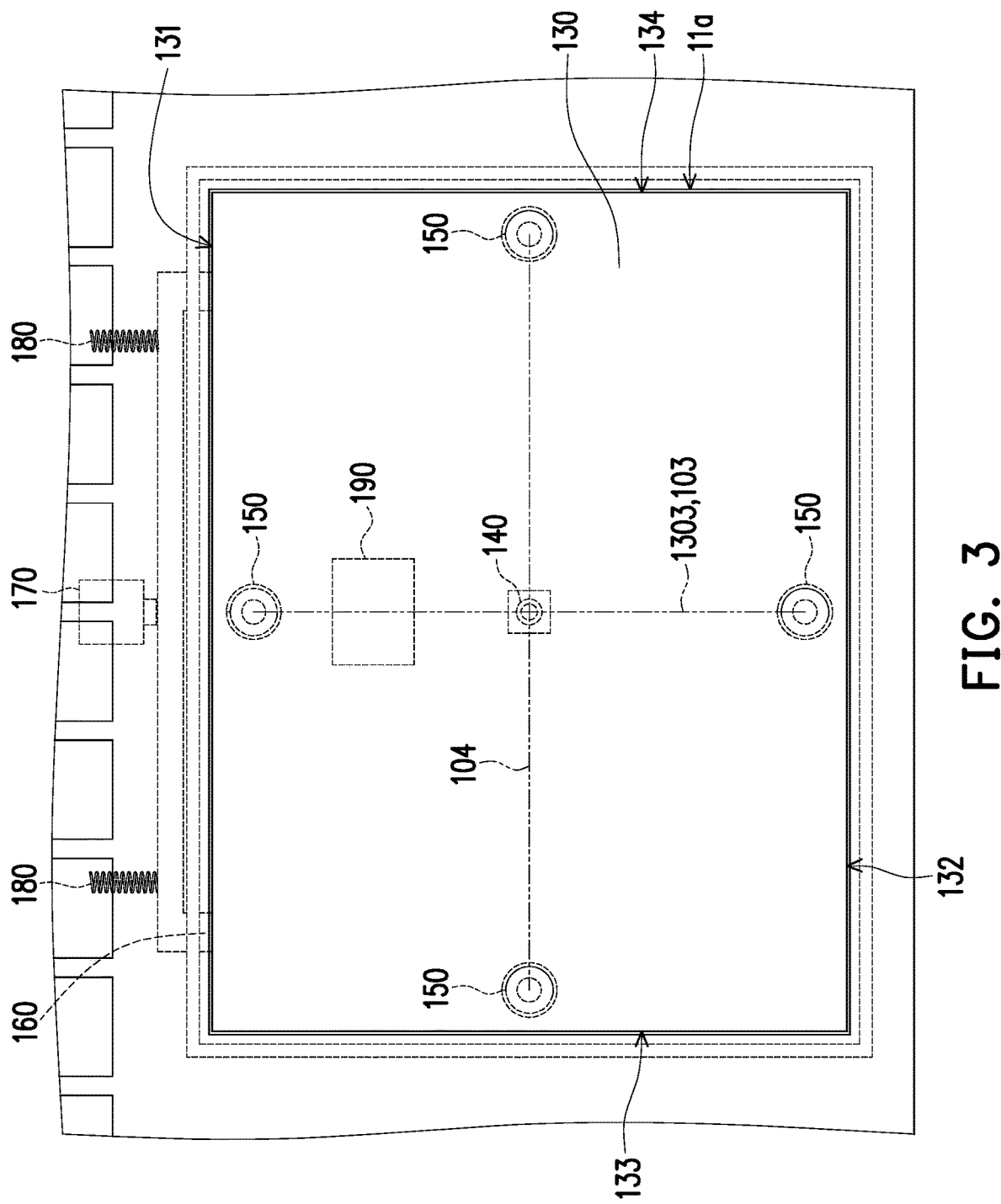
FIG. 3 is a partial top schematic view of the electronic device according to the second embodiment of the disclosure.

Referring to FIG. 3, different from the first embodiment, in this embodiment, the first springs 150 are distributed on the first side 131, the second side 132, the third side 133, and the fourth side 134, for example, respectively located a center position of the first side 131, the second side 132, the third side 133, and the fourth side 134.

In detail, the first connecting line 103 between the first spring 150 distributed on the first side 131 and the first spring 150 distributed on the second side 132 is perpendicular to the first side 131 and the second side 132, and overlap the center line 1303 of the touch pad 130. In addition, the second connecting line 104 between the first spring 150 distributed on the third side 133 and the first spring 150 distributed on the fourth side 134 is perpendicular to the third side 133 and the fourth side 134, and perpendicular to the first connecting line 103. The switch 140 is located at the center of the touch pad 130 and is seated on the intersection point of the first connecting line 103 and the second connecting line 104.

Figure 4:
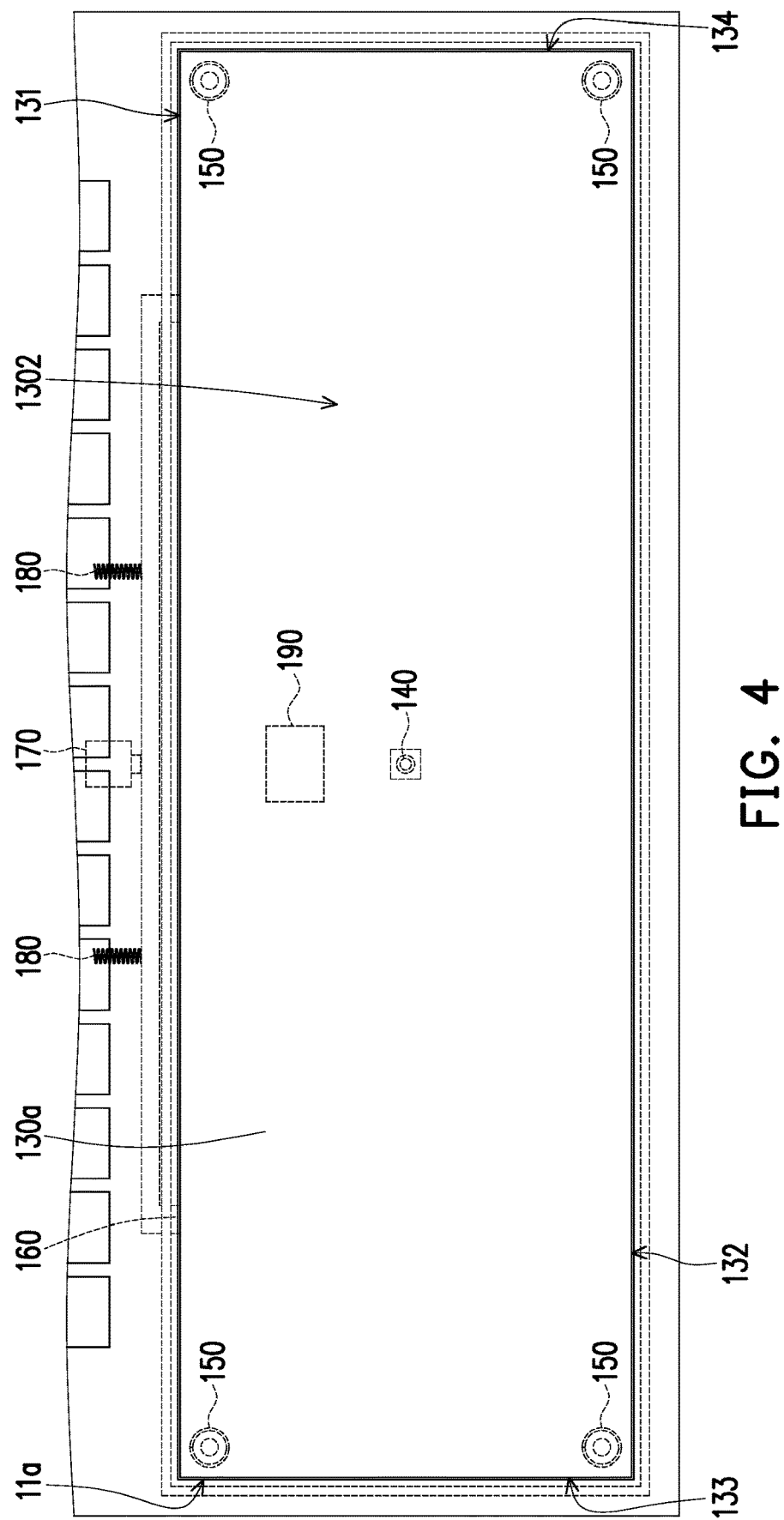
FIG. 4 is a partial top schematic view of the electronic device according to the third embodiment of the disclosure.

Referring to FIG. 4, the distribution of the first springs 150 of this embodiment is the same or similar to the distribution of the first springs 150 of the first embodiment, the difference between the two is that the touch surface 1302 of the touch pad 130a in this embodiment has a larger touch area to improve the operation convenience.

In other examples, the distribution of the first springs 150 may be the same as or similar to the distribution of the first springs 150 of the second embodiment.

Figure 5:
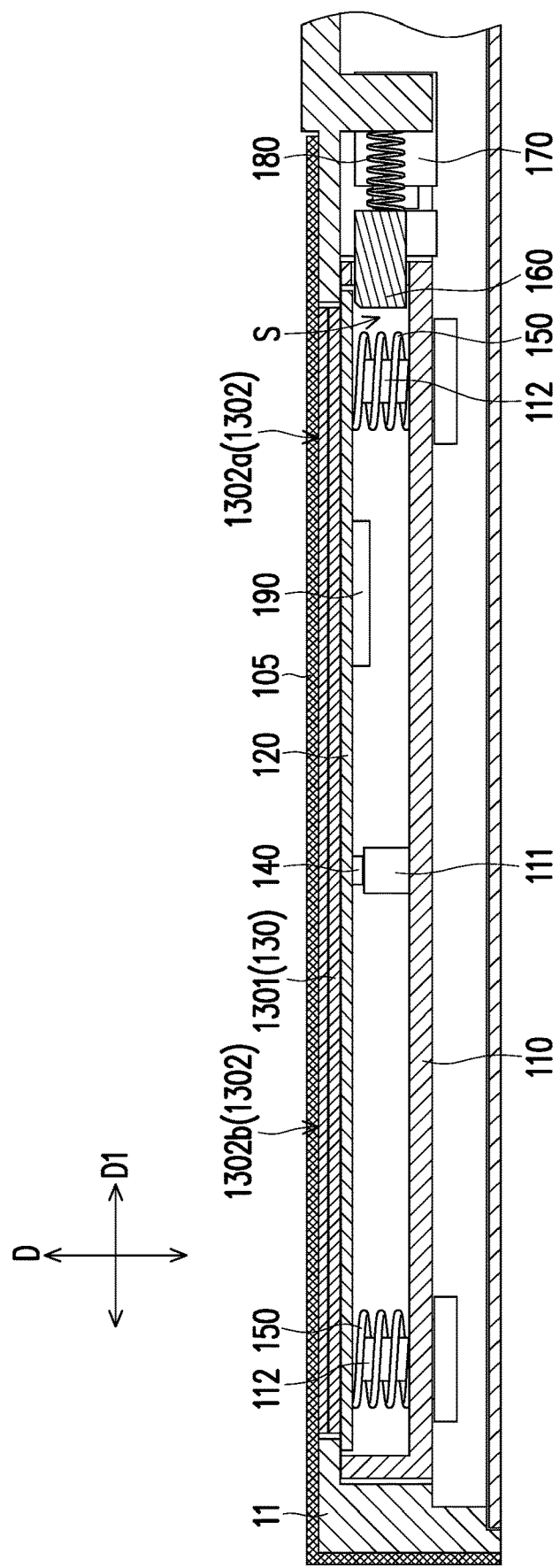
FIG. 5 is a partial cross-sectional schematic view of the electronic device according to a fourth embodiment of the disclosure.

Referring to FIG. 5, different from the first embodiment, in this embodiment, the touch surface 1302 of the touch pad 130 is covered by a decorative layer 105, and the assembly gap between the touch pad 130 and the body 110 is also covered by the decorative layer 105 to enhance the beauty and integrity of the appearance. For example, the decorative layer 105 may be leather, cloth or other suitable flexible materials.

To sum up, the switch is located at the center of the touch pad, and the touch pad that is pressed or tapped may sink as a whole to trigger the switch. Furthermore, the pressing or tapping behavior from the user on any position on the touch pad may drive the touch pad to sink to trigger the switch. On the other hand, based on the detection result of the touch event on the touch pad, such as detecting that the palm of the user contacts the touch pad, the driver is activated to drive the limiting member to slide into the space between the frame and the carrier, so that the partial area of the touch pad is stopped by the limiting member and cannot sink, preventing the switch from being accidentally triggered. Therefore, for the user, the touch pad structure and the electronic device of the disclosure not only have excellent operation convenience, but also have excellent operation reliability.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A touch pad structure, comprising:
   a carrier;
   a frame, disposed above the carrier;
   a touch pad, disposed on the frame, wherein the frame is located between the carrier and the touch pad;
   a switch, disposed on the touch pad, penetrating through the frame and facing the carrier; and
   four first springs, distributed at a peripheral of the touch pad, two opposite ends of each of the first springs respectively contacting the carrier and the frame, two longest connecting lines between the four first springs defining as a first connecting line and a second connecting line;
   wherein, the switch is seated on an intersection point of the first connecting line and the second connecting line.

2. The touch pad structure according to claim 1, wherein the first springs are distributed on four corners or four sides of the touch pad.

3. The touch pad structure according to claim 1, wherein the carrier comprises a trigger, the trigger faces the frame and is located at a position corresponding to the switch.

4. The touch pad structure according to claim 1, wherein the carrier comprises four positioning posts protruding towards the frame, and the first springs are respectively sleeved on the positioning posts.

5. The touch pad structure according to claim 1, wherein the touch pad has a first side and a second side opposite to each other, and a distance between the switch and the first side is equal to a distance between the switch and the second side.

6. The touch pad structure according to claim 5, further comprising:
   a limiting member, disposed corresponding to the first side of the touch pad, and a space is between the frame and the carrier, the limiting member is suitable for moving into or out of the space.

7. The touch pad structure according to claim 1, further comprising:
   a driver, coupled to the limiter, for driving the limiter to slide; and
   a second spring, disposed on a same side of the limiting member as the driver, and connected to the limiting member.

8. The touch pad structure according to claim 1, wherein the touch pad is a capacitive touch pad, when the touch pad detects a first touch event, the driver is activated to drive the limiting member to slide into the space;
   when the touch pad detects a second touch event, the driver is turned off and the limiting member is driven to slide out of the space through the second spring.

9. The touch pad structure according to claim 1, further comprising:
   a sensor, disposed on the frame and located between the frame and the carrier;
   wherein, when the sensor detects a third touch event on the touch pad, the driver is activated to drive the limiting member to slide into the space;
   when the sensor detects a fourth touch event on the touch pad, the driver is turned off and the limiting member is driven to slide out of the space through the second spring.

10. The touch pad structure according to claim 1, wherein the touch pad has a third side and a fourth side opposite to each other, and the four first springs are respectively located at a center position of the first side, the second side, the third side, and the fourth side.

11. An electronic device, comprising:
   a body, having a structural member; and
   a touch pad structure, disposed in the body, the touch pad structure comprising:
      a carrier;
      a frame, disposed above the carrier;
      a touch pad, disposed on the frame, wherein the frame is located between the carrier and the touch pad;
      a switch, disposed on the touch pad, penetrating through the frame and facing the carrier; and
      four first springs, distributed at a peripheral of the touch pad, two opposite ends of each of the first springs respectively contacting the carrier and the frame, two longest connecting lines between the four first springs defining as a first connecting line and a second connecting line;
   wherein, the switch is seated on an intersection point of the first connecting line and the second connecting line.

12. The electronic device according to claim 11, wherein a limiting member is disposed on the structural member.

* * * * *